Feb. 27, 1940.  A. P. ARMINGTON  2,191,445
VEHICLE BODY
Filed Aug. 11, 1936  2 Sheets-Sheet 1
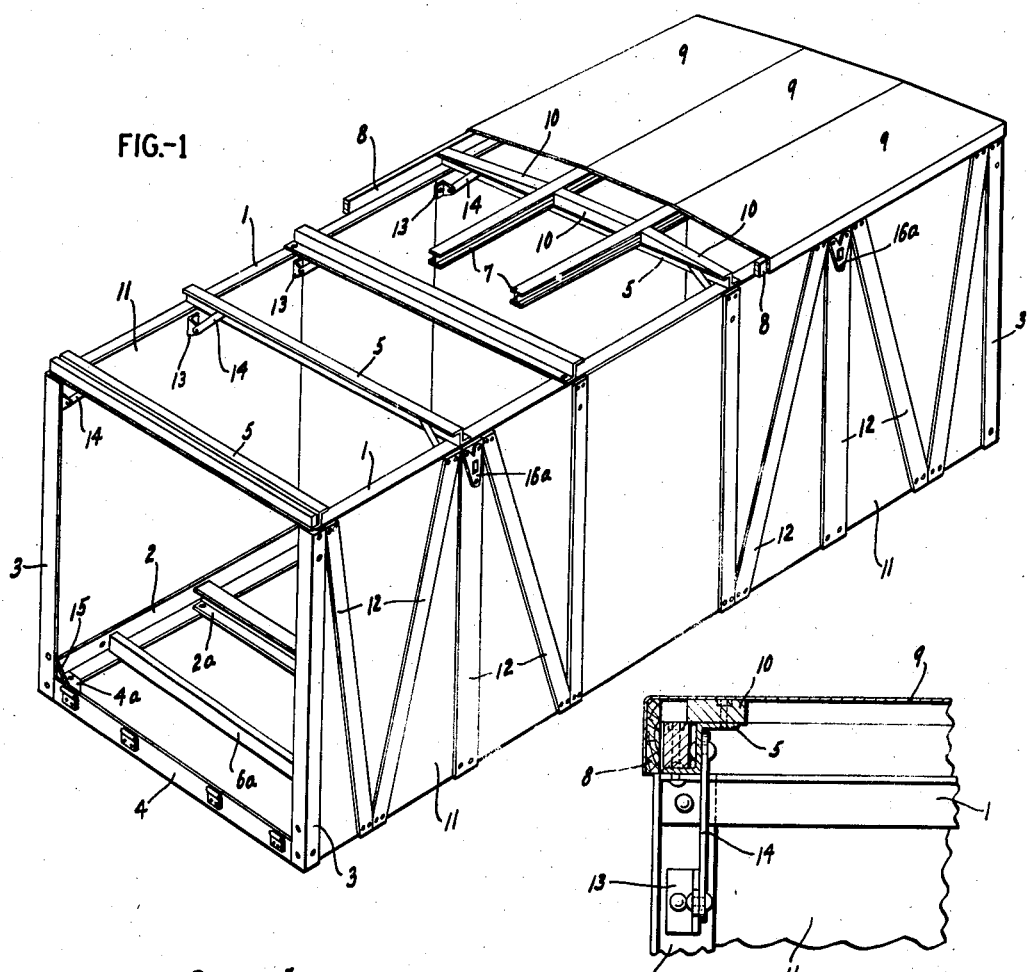
FIG.-1
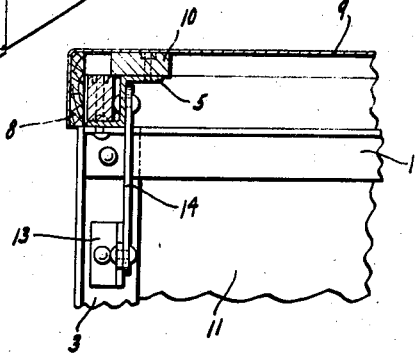
FIG.-3
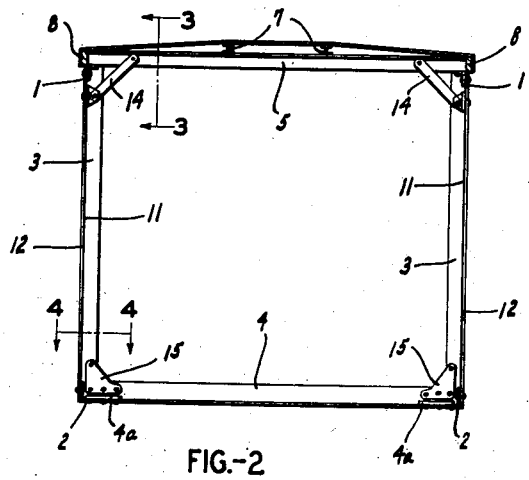
FIG.-2
FIG.-4
INVENTOR
ARTHUR P. ARMINGTON
BY Brockett, Hyde, Higley & Meyer
ATTORNEYS Feb. 27, 1940.        A. P. ARMINGTON        2,191,445
                         VEHICLE BODY
                    Filed Aug. 11, 1936        2 Sheets-Sheet 2

INVENTOR
ARTHUR P. ARMINGTON
BY
Brockett, Hyde, Higley & Meyer
ATTORNEYS

Patented Feb. 27, 1940

2,191,445

UNITED STATES PATENT OFFICE 2,191,445

VEHICLE BODY

Arthur P. Armington, Willoughby, Ohio; Katherine Stewart Armington, executrix of Arthur P. Armington, deceased Application August 11, 1936, Serial No. 95,487

7 Claims. (Cl. 220—1.5)

This invention relates to container bodies for vehicles and particularly contemplates a box body transferrable between chassis as between rail and highway vehicles.

Width, length and weight limitations on highway freight hauling vehicles make efficient construction of their bodies imperative, and the construction is particularly important where the body, in addition to its usual function of hauling a maximum load for its outer dimensions, must be able to withstand the abuse of crane lifting in the transfer from one vehicle to another. Furthermore it is desirable to keep the outside surfaces of the body as free as possible from projections which might create substantial air resistance at higher speeds of travel.

The general object of this invention then are to provide a body best suited to serve under the conditions described.

More particular objects are to devise a body having relatively thin side walls and therefore a maximum ratio of inside to outside width, one of self-sustaining structure regardless of its supporting means, one that while reasonably stiff laterally yet will stand lateral and twisting deflection without taking a permanent set, and one free from large projecting areas. Further objects are to provide novel lifting means for the body, requiring a minimum of lateral projection therefrom, and to provide an improved floor structure comprising a permanent frame and planking unit separately assembled thereto.

Figure 5:
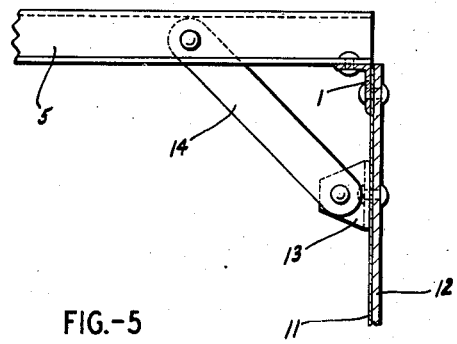
Figure 6:
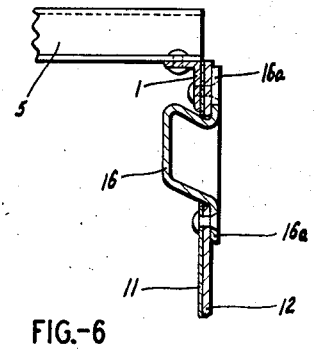
Figure 7:
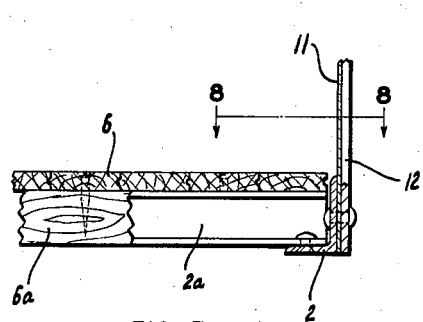
Figure 8:
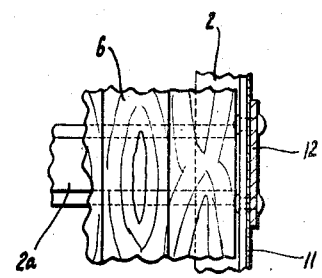
Figure 10:
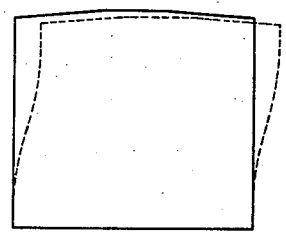
Figure 9:
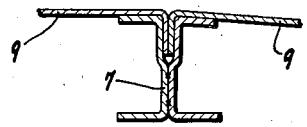

The exact nature of this invention together with further objects and advantages thereof will be apparent from the following description taken in connection with the accompanying drawings, in which Fig. 1 is a perspective view of a typical embodiment of the invention with parts broken away to show details of construction but without the bottom planking; Fig. 2 is a typical transverse sectional elevation of the same; Figs. 3 to 9 inclusive are enlarged sectional details; Fig. 3 shows a roof corner construction as in the plane of line 3—3, Fig. 2; Fig. 4 shows an end corner as in the plane of line 4—4, Fig. 2; Fig. 5 illustrates in transverse section, a typical connection between side and roof; Fig. 6 is a similar view but showing the construction at one of the lifting sockets; Fig. 7 is a transverse sectional elevation showing relation between floor and wall; Fig. 8 is a horizontal section at the same location as in the plane of line 8—8, Fig. 7; Fig. 9 is a roof detail in sectional elevation; and Fig. 10 is a diagrammatic view illustrating the lateral deflection characteristics of the structure.

With reference now to the drawings, the body is generally of box form having floor and roof structures interconnected by a pair of side wall structures, and as here illustrated is provided with an open end appearing in Fig. 1 and adapted to be closed by a bottom hinged door not shown, the other end being closed.

At each longitudinal corner of the body 1 is located an angle iron so that an upper pair of such angle irons 1 are located at opposite sides of the roof and a lower pair of such angle irons 2 are located at opposite sides of the floor. The upper angle irons are supported above the lower ones by upright angle irons 3 located at the corners of the body, and the lower angle irons 2 are interconnected at the ends of the body by transverse angle irons 4 through gussett plates 4a. The upper angle irons 1 are interconnected by a number of transverse members such as the Z-bars 5, and the lower angle irons are interconnected by a number of cross tie members 2a. The described parts thus constitute a sort of frame.

The floor structure of the body is completed by heavy flanking 6 laid longitudinally of the body over the members 2a, which planking may be interconnected by timbers 6a in staggered relation to the members 2a, resting at their ends upon the angle irons 2, and forming a removable wooden floor unit, which may be positioned after assembly of the metal parts. The angle irons 2 being firmly interconnected by the members 2a, these parts form a floor frame structure which has considerable rigidity, the angles being well secured against twisting.

The roof structure here shown includes a spaced pair of I-beams 7 disposed longitudinally of the body upon the Z-bars 5 and secured to the latter, each beam 7 being formed by welding together a pair of channels of the form shown in Fig. 9. Wooden runners 8 are disposed at the edges of the roof and three longitudinally disposed sheet metal members 9 are provided for covering the roof, the central one having its lateral edges turned into the cavities of the beams 7 and each outer one having its inner edge similarly turned into the cavity of one of the beams 7 and its outer edge turned down over the adjacent runner 8. Thus the center covering panel 9 is horizontal while the lateral ones have slight lateral slope. Filler blocks 10 mounted on the Z-bars 5 serve to support the panels 9 against collapse, so that the panels may be of light gauge yet the roof be walked upon.

It is to be noted that the upper angle irons 1 are rigidly maintained against twisting, by the transverse members 5, and may be considered as a part of the roof structure similarly as the lower members 2 may be considered a part of a rigid floor structure as already described.

According to this invention side wall panel structures are provided, having less rigidity than the floor and roof structures. As here shown the side walls comprise metal sheets 11 extending vertically between each lower member 2 and its upper member 1, overlying the vertical flanges of these members, and longitudinally of the body underlying the side flanges of the end members 3. Overlying each sheet 11 are flat upright members 12 of substantial resilience such as of spring steel, secured at their ends to the vertical flanges of the members 2 and 1 respectively as by the rivets indicated, which rivets extend through the sheet member 11, the latter being thus clamped to the floor and roof structures at intervals along its upper and lower edges. As indicated in Fig. 1 some of the members 12 are vertically disposed—vertical members 12 being preferably located at the ends of the Z-bars 5 and ties 2a—while others have slope to provide truss effect against stresses fore and aft of the body. The sheet members 11 may be additionally secured to their spring members 12 by rivets along the latter but not shown.

To insure maintenance of the illustrated angularity between the roof structure and adjacent side wall parts, brackets 13 are riveted or otherwise mounted on the uprights 12 adjacent their Z-bars 5, and braces 14 are arranged to connect the brackets with their Z-bars. To assist in maintaining the lower angles 2 against twisting, gusset plates 15 may be located at the ends of the body.

It is to be noted that the described arrangement provides relative rigidity of roof and floor structure as against relative flexibility of side wall structure, and also provides maintenance of the angular relation between panels at the four corners of the body in transverse section. Thus as illustrated in Fig. 10 under lateral stresses such as developed in sidesway and particularly longitudinal twisting or wracking, deflection will be substantially limited to the body sides, which will be caused to flex with reverse curvature, and while reasonably stiff will permit some lateral and twisting deflection of the body as a whole without taking a permanent set. In practice the side walls will be preferably lined as is usual, with laminated wood or the like for protection of the metal against the body contents, such lining forming no part of this invention and being therefore not illustrated.

For lifting the body a pair of upright members 12 on each side are perforated adjacent their upper ends to receive recessed portions of socket members 16, each having a flange part 16a overlying its member 12 and riveted thereto and to the adjacent roof or frame member 1 as illustrated in Fig. 6. The recessed part of each socket member is formed as illustrated to receive a lifting hook, with sloping top wall engageable by the hook, sloping lower wall for drainage, and imperforate for protection of the body contents from the weather.

It will be observed that the members 12 and socket members 16 have minimum extent from the general plane of their side walls which latter have minimum thickness yet from their very thinness and accompanying resilience, and the manner of their connection with floor and roof, provide ample strength combined with minimum weight for the body as a whole.

What I claim is:

1. In a vehicle body of the class described, floor and roof structures, and means at the sides of said body interconnecting said structures and consisting of flat sheets and spring members disposed to yieldably resist lateral body deflection, each spring member having one end part rigidly secured to one of said structures and its other end part rigidly secured to the other structure with a straight flat portion between said end parts, whereby said spring member flat portions are constrained to assume reverse curvature under such deflection.

2. In a vehicle body of the class described, substantially rigid floor and roof structures, and means at the sides of said body interconnecting said structures and consisting of flat sheets and spring members disposed to yieldably resist lateral body deflection, each spring member having one end part rigidly secured to one of said structures and its other end part rigidly secured to the other structure with a straight flat portion between said end parts, whereby said spring member portions are constrained by their said end parts to assume reverse curvature under such deflection.

3. In a vehicle body of the class described, floor and roof structures, and means at the sides of said body interconnecting said structures and consisting of flat sheet metal panels and spring members disposed flat against said panels and secured thereto, each said spring member with its underlying panel having one end rigidly secured to one of said structures and its other end rigidly secured to the other structure.

4. Vehicle body construction of the class described comprising associated floor and wall structures, said wall structure consisting of flat sheet metal panels, and flat spring strip members secured to said floor structure overlying said panels with clamping effect upon the latter.

5. Vehicle body construction comprising associated floor and wall structures, said wall structure consisting of flat spring strip members secured to said floor and extending upwardly therefrom and a flat sheet metal panel clamped between said floor structure and said strip members.

6. In a vehicle body of the class described, floor and roof structures having rigidly connected vertical flanges along their sides, and means at the sides of said body interconnecting said structures and consisting of flat sheet metal panels each disposed with horizontal edge parts overlying the corresponding of said flanges, and spring members disposed flat against said panels, each spring member having its opposite ends rigidly secured to the flanges on its side of the body, with clamping effect upon said edge parts of the corresponding panel.

7. In a vehicle body of the class described, a floor structure, a roof structure having rigid transverse members, means at the sides of the body interconnecting said structures and consisting of flat sheet metal panels each with horizontal edge parts overlying said structures, and spring members disposed flat against said panels opposite said roof structure transverse members, each spring member having its opposite ends secured to said structures with clamping effect upon said edge parts of the corresponding panel, and brace means interconnecting each spring member and its said transverse member.

ARTHUR P. ARMINGTON.